United States Patent
Goodfellow et al.

(10) Patent No.: US 10,938,230 B2
(45) Date of Patent: Mar. 2, 2021

(54) SYSTEMS AND METHODS FOR A WIRELESS CHARGING MOUNT

(71) Applicant: JUGGERNAUT DEFENSE, LLC, Scottsdale, AZ (US)

(72) Inventors: Andrew C. Goodfellow, Scottsdale, AZ (US); Thomas Muday, Scottsdale, AZ (US); Chris Stalzer, Scottsdale, AZ (US)

(73) Assignee: Juggernaut Defense, LLC, Scottsdale, AZ (US)

( * ) Notice: Subject to any disclaimer, the term of this patent is extended or adjusted under 35 U.S.C. 154(b) by 206 days.

(21) Appl. No.: 16/122,677

(22) Filed: Sep. 5, 2018

(65) Prior Publication Data

US 2020/0076219 A1     Mar. 5, 2020

(51) Int. Cl.
*H02J 7/00*     (2006.01)
*H02J 7/02*     (2016.01)
*H02J 50/10*    (2016.01)

(52) U.S. Cl.
CPC ............ *H02J 7/025* (2013.01); *H02J 7/0027* (2013.01); *H02J 50/10* (2016.02)

(58) Field of Classification Search
CPC ........ H02J 7/025; H01F 38/14; Y02T 90/122; B60L 11/182; Y02E 60/12
See application file for complete search history.

(56) References Cited

U.S. PATENT DOCUMENTS

| | | | |
|---|---|---|---|
| 2002/0089305 A1* | 7/2002 | Park | H02J 7/00036 320/108 |
| 2013/0244735 A1 | 9/2013 | Bury | |
| 2015/0069965 A1* | 3/2015 | Verschueren | H02J 50/10 320/108 |
| 2016/0036478 A1 | 2/2016 | Wong | |

OTHER PUBLICATIONS

Extended European Search Report issued in corresponding European Application 19195526.9 dated Jan. 21, 2020, 7 pages.

* cited by examiner

*Primary Examiner* — Arun C Williams
(74) *Attorney, Agent, or Firm* — Polsinelli PC

(57) ABSTRACT

Embodiments of a charging system to be coupled with a protective cover and/or portable device for wireless charging are disclosed. The charging system includes a charging mount defining a rear surface and a front surface. The rear surface and the front surface of the mount body define a first thickness. The charging mount is configured to be coupled with a portable device having a device coil such that the front surface of the charging mount is adjacent to the portable device. The mount body corresponding with a coil receiver defines a second thickness which is less than the first thickness. A charging module is removably coupled with the rear surface of the charging mount and positioned within the module receiver. The charging module includes a coil operable to interact with the device coil to wirelessly charge the portable device. The coil is positioned within the coil receiver.

20 Claims, 11 Drawing Sheets

SYSTEMS AND METHODS FOR A WIRELESS CHARGING MOUNT

FIELD

The present disclosure generally relates to wireless charging systems for portable devices, and in particular to charging systems configured to minimize a distance between a coil in a charging module and a coil in a portable device to allow for wireless charging when engaged to the charging module.

BACKGROUND

Wireless charging systems use an electromagnetic field to transfer energy between two objects through induction. For example, a portable device may include an inductive coil, and a charging system may include a corresponding inductive coil. The coils of the portable device and the charging system need to be within a minimum distance to interact and allow for effective wireless charging of the portable device. However, many protective cases used to protect the charging system and the portable device, respectively, can be thick and bulky in order to provide sufficient protection from impacts or other exterior forces that may be applied to either the charging system or the portable device. As such, the distance between the coil of the portable device and the coil of the charging system may be too far apart to permit effective or efficient operative interaction between the two coils during wireless charging.

It is with these observations in mind, among others, that various aspects of the present disclosure were conceived and developed.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1:
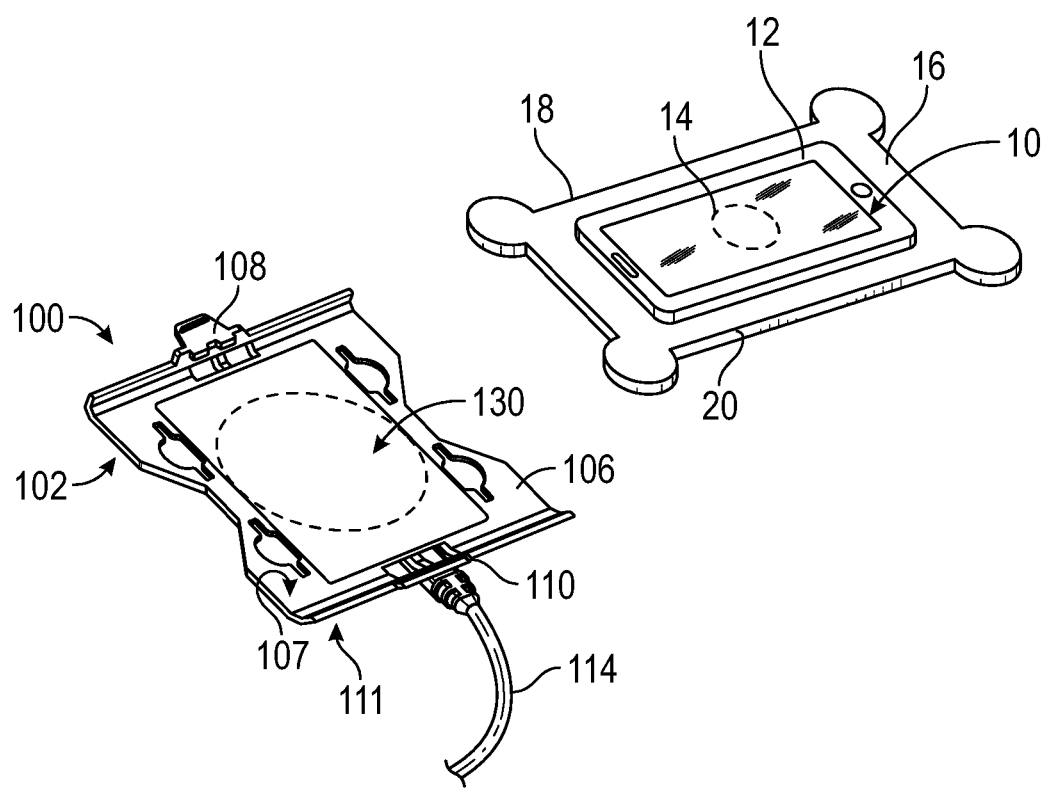
FIG. 1 is an exploded, perspective view of a charging system configured to be coupled to a portable device, according to aspects of the present disclosure.

The present disclosure relates to a charging system configured to couple with a portable device and/or a protective case that encases a portable device. In some embodiments, the charging system includes a charging mount to couple with the portable device and/or the protective case of the portable device and a charging module which includes a coil configured to interact with a device coil in the portable device for wireless charging of the portable device. In some embodiments, the charging module may be removably coupled with the charging mount. The construction of the charging mount and the protective case of the portable device are configured such that the coil and the device coil can efficiently interact during a wireless charging. In some embodiments, the charging mount includes a coil receiver which may define a recess or an aperture. In one embodiment, the coil of the charging module may be received within the coil receiver such that the reduced material thickness of the charging module between the coil and the device coil allows for efficient interaction being established between the coil and the device coil for wireless charging. In another embodiment, the coil of the charging module may be received within the coil receiver adjacent an aperture defined by the charging mount for allowing the efficient interaction between the coil and the device coil for wireless charging. Referring to the drawings, embodiments of a charging system are illustrated and generally indicated as 100 in FIGS. 1-12.

Referring to FIG. 1, an embodiment of a charging system, designated 100, includes a charging mount 102 configured to be removably coupled with a protective case 16 for a portable device 10. While the present disclosure discusses the charging system 100 being coupled with the protective case 16, in some embodiments, the charging system 100 can also couple directly with the portable device 10. The portable device 10 includes a device coil 12 which is disposed within a device housing 12. In some embodiments, the portable device 10 may be a phone such as a smartphone or a tablet. In some embodiments, the portable device 10 may be encased in a protective case 16. The protective case 16 at least partially surrounds the device housing 12 of the portable device 10. In one aspect, the protective case 16 may prevent wear of the device housing 12 and/or decrease any force that may be applied to the portable device 10, for example when the portable device 10 is dropped to the ground or receives other types of impacts from an external source. Exemplary protective cases 16 are the JUGGERNAUT CASE, the JUGGERNAUT SLEEV, the JUGGERNAUT BUMPR, and the JUGGERNAUT IMPCT; however, the types of protective cases 16 are not limited to these specific examples.

Referring to FIGS. 1-5, the charging mount 102 of charging system 100 has a mount body 106 defining a front surface 107 and an opposite rear surface 111. In some embodiments, the charging mount 102 includes a first device coupler 108 and a second device coupler 110 which extend from opposite respective first and second sides 18, 20 of the mount body 106. In particular, as shown in FIG. 1, the first device coupler 108 is configured to abut a first side 18 of the protective case 16 and the second coupler 110 is configured to abut the second side 20 of the protective case 16 such that the protective case 16 is securely engaged to the charging mount 102. In some embodiments, the first device coupler 108 and the second device coupler 110 collectively engage with the protective case 16 by a snap fit connection. For example, when the protective case 16 is coupled with the charging mount 106, the first device coupler 108 and the second device coupler 110 initially engages and deflects away from the first and second sides 18, 20 of the protective case 16 and then the first and second device couplers 108 and 110 revert to their original shape such that the protective case 16 becomes fully engaged with the charging mount 106. As such, unlike conventional magnetic coupling, the charging mount 106 is physically coupled with the protective case 16 and/or the portable device 10 even if the protective case 16 and/or the portable device 10 is moved or experiences an external force. Other suitable methods for coupling the charging mount 106 with the protective case 16 may be utilized. When the charging mount 106 is coupled with the protective case 16, the front surface 107 of the mount body 106 is positioned directly adjacent to the protective case 16. In some embodiments, the mount body 106 may be made of a plastic. In some embodiments, the mount body 106 may be made of acrylonitrile butadiene styrene and/or polycarbonate.

Referring specifically to FIG. 1, the charging system 100 may also include a coil 130 of the charging module 104 that is configured to interact with the device coil 14 of the portable device 10 for allowing wireless charging of the portable device 10. In some embodiments, the operative interaction between the coil 130 and the device coil 14 is electromagnetic induction. In some embodiments, the coil 130 of the charging module 104 functions as a transmitting coil. In addition, the coil 130 generates an oscillating magnetic field such that the magnetic field induces an alternating current in a receiving coil, for example the device coil 14. As such, the coil 130 and the device coil 14 collectively provide inductive charging of the portable device 10. For example, the coil 130 and the device coil 14 may provide a voltage up to 5 volts and a current up to 2 amperes during charging of the portable device 10. In some embodiments, the inductive charging of the portable device 10 operates under the QI standard. The coil 130 and the device coil 14 must be within a predetermined distance to properly interact and allow for wireless charging. In some instances, the protective case 16 may be large and add bulk or size that surrounds the encased portable device 10, which can necessarily increase the distance between the coil 130 and the device coil 14 and thereby prevent the wireless charging system from properly interacting with portable devices 10 engaged to the charging mount 104. As such, the charging system 100 as discussed herein minimizes the distance between the coil 130 and the device coil 14 to allow for the efficient wireless charging of portable devices 10 encased in protective cases 16.

Figure 2:
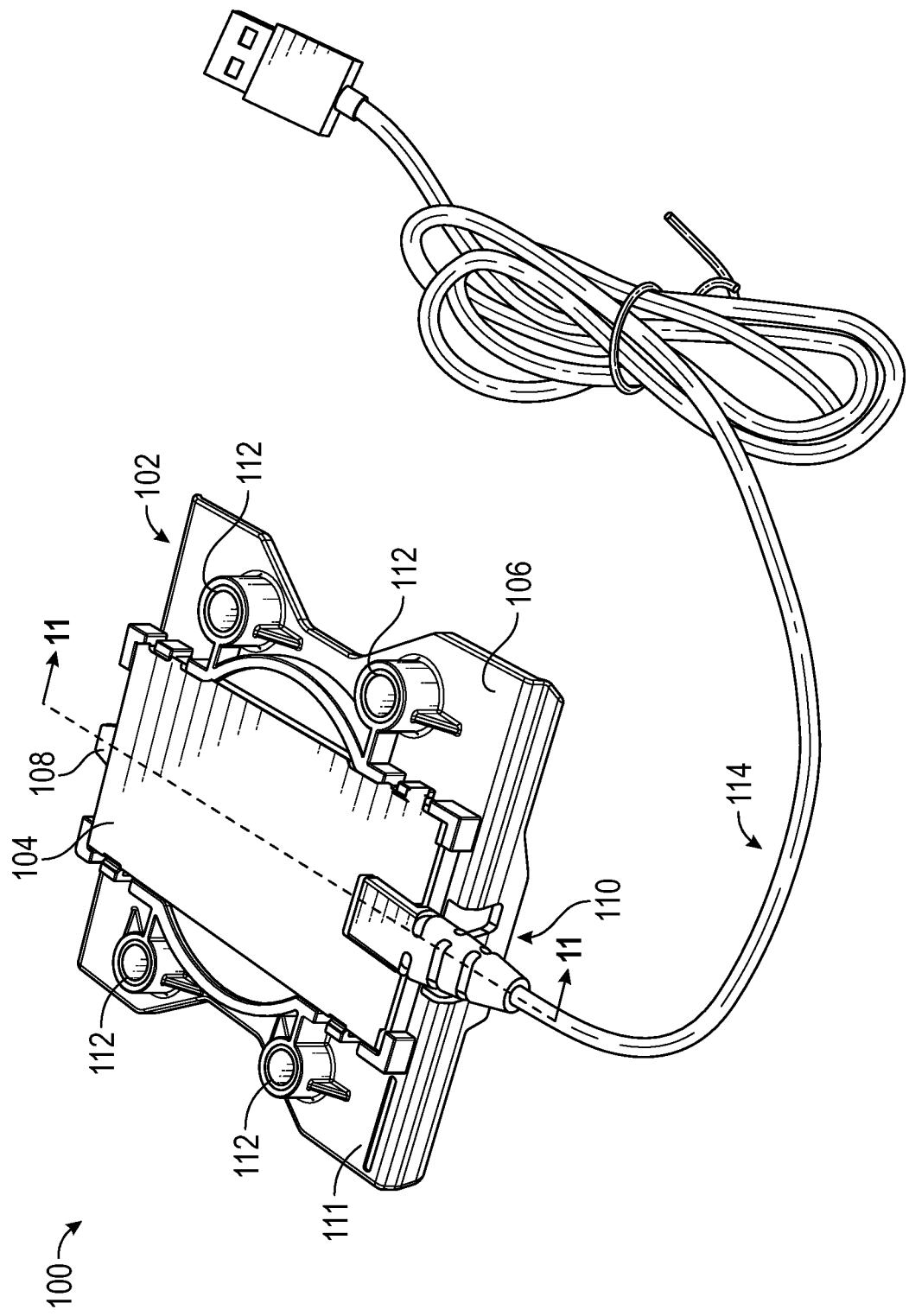
FIG. 2 is a rear perspective view of the charging system having a charging mount and a charging module, according to aspects of the present disclosure.
Figure 3:
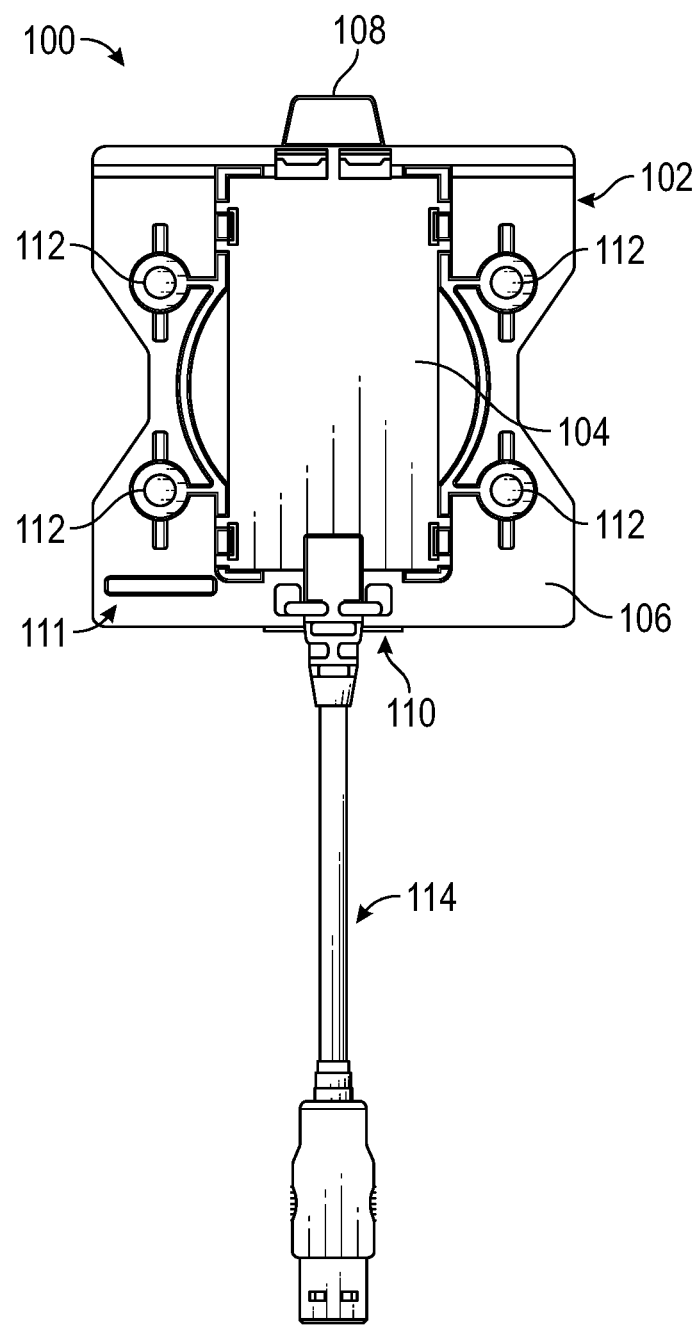
FIG. 3 is a rear view of the charging system of FIG. 2, according to aspects of the present disclosure.
Figure 4:
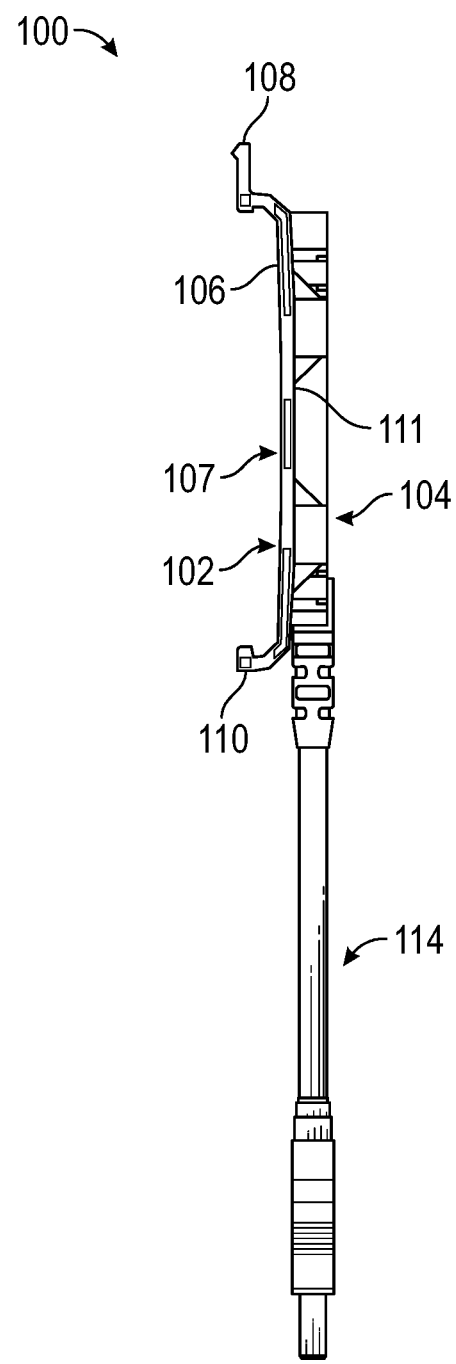
FIG. 4 is a side elevational view of the charging system of FIG. 2, according to aspects of the present disclosure.
Figure 5:
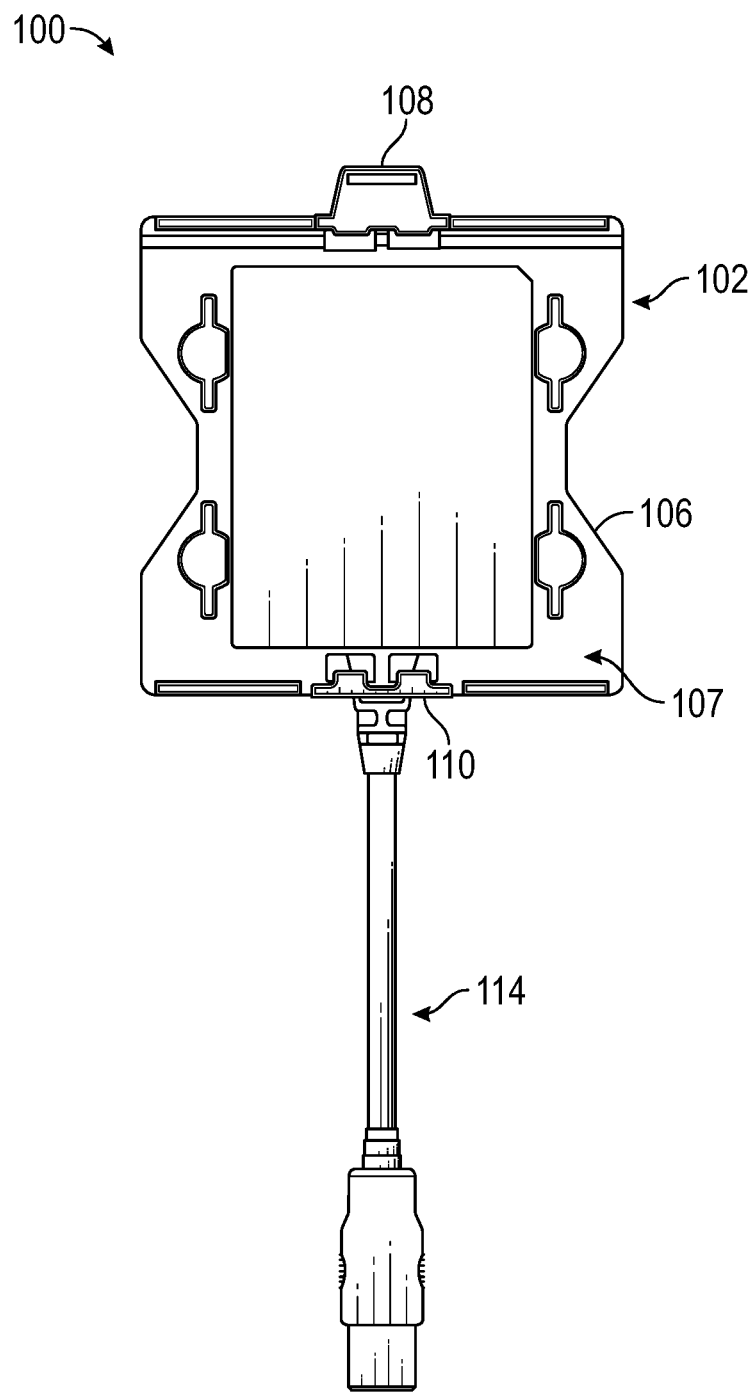
FIG. 5 is a front elevational view of the charging system of FIG. 2, according to aspects of the present disclosure.

Referring to FIGS. 2 and 3, the rear surface 111 of the mount body 106 is configured to receive a charging module 104. In some embodiments, the charging module 104 includes the coil 130 for wireless charging the portable device 10. As shown, the charging module 104 also includes a connector 114 which can transfer data and/or power to and from the charging module 104. In some embodiments, the connector 114 may be a USB A cable. In other embodiments, the connector 114 may be a USB C cable, a lightning cable, a mini-USB cable, or any other suitable connector to transfer data and/or power. In some embodiments, the connector 114 may be removably coupled with the charging module 104. When the connector 114 is coupled with the charging module 104, fluid is prevented from communicating across the connection of the connector 114 and the charging module 104 such that the connection is substantially waterproof. In other embodiments, the connector 114 may be fixedly coupled with the charging module 104 by soldering or any other suitable method of attachment. The connector 114 may be overmolded such that fluid is prevented from communicating across the connection of the connector 114 and the charging module 104. As such, the connection is substantially waterproof.

Figure 10:
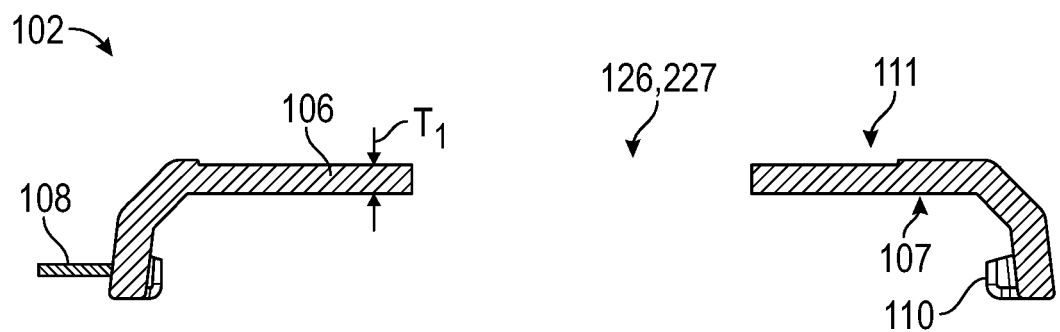
FIG. 10 is a cross-sectional side view of another embodiment of the charging mount of FIG. 9; according to aspects of the present disclosure.

A plurality of external fasteners 112 extend from the rear surface 111 of the mount body 106 with each external fastener 112 being configured to correspond with and engage an external mount 132 as illustrated in FIG. 10 when coupling the charging mount 102 to the external mount 132. As shown in FIGS. 2 and 3, in some embodiments the charging mount 102 includes four external fasteners 112; however, in other embodiments, one, two, three, five, or more external fasteners 112 may be included as desired.

Figure 6:
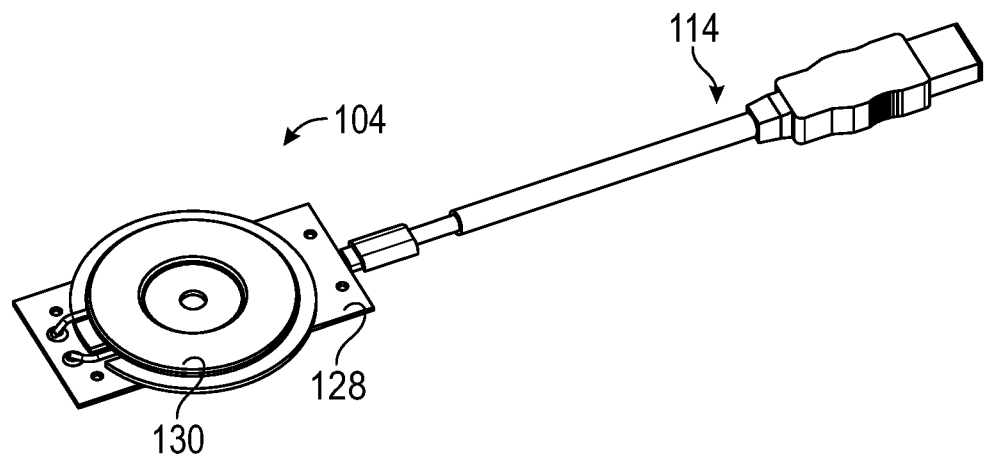
FIG. 6 is a perspective view of the charging module of FIG. 2 omitting a module casing, according to aspects of the present disclosure.
Figure 7:
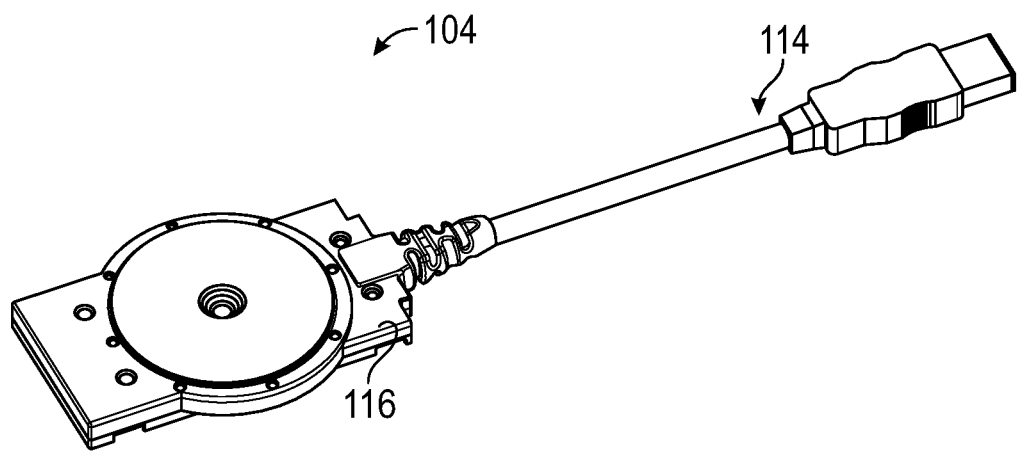
FIG. 7 is a perspective view of the charging module of FIG. 2 with the module casing, according to aspects of the present disclosure.

Referring to FIGS. 6 and 7, in some embodiments the charging module 104 includes a circuit board 128, a coil 130 coupled with the circuit board 128, and a connector 114 which is also coupled with the circuit board 128. The coil 130 as illustrated is substantially circular. In other embodiments, the coil 130 may be substantially rectangular, ovoid, triangular, or any other suitable shape. FIG. 6 illustrates the charging module 104 omitting a module casing, and FIG. 7 illustrates the charging module 104 with a module casing 116.

In some embodiments, the module casing 116 includes an overmolded polymer surrounding the coil 130, the circuit board 128, and at least a portion of the connector 114. In some embodiments, the overmolded polymer of the module casing 116 is a thermoplastic material, for example a thermoplastic elastomer. In some embodiments, the overmolded polymer of the module casing 116 may be potted with an epoxy. In some embodiments, the module casing 116 is waterproof such that fluid communication across the module casing 116 with the coil 130 and/or the circuit board 128 is prevented. The coil 130 and/or the circuit board 128 can be encapsulated with the overmolded module casing 116. An epoxy may then be used to pot any holes caused by the overmolding tool to achieve a waterproof module casing 116. In some embodiments, the module casing 116 of the charging module 104 may be rated at IP58 or better, where an IP58 rating means that the charging module 104 is dust resistant and can be immersed in 1.5 meters of freshwater for up to 30 minutes. In some embodiments, the module casing 116 of the charging module 104 may be rated at IP67 or better, where an IP67 rating means that the charging module 104 is dust tight such that there is no ingress of dust and can be immersed in up to 1 meter of freshwater for up to 30 minutes.

In some embodiments, the module casing 116 is rugged such that the charging module 104 can function under high environmental stresses. In some embodiments, environmental stresses may be, for example, extreme temperatures, vibrations, shock, high altitude, and/or humidity. For example, the charging module 104 may function in temperatures ranging from about −50° C. to 100° C., vibration of up to about 2000 Hz, altitude up to about 70,000 feet, and/or humidity up to about 100%.

Figure 8:
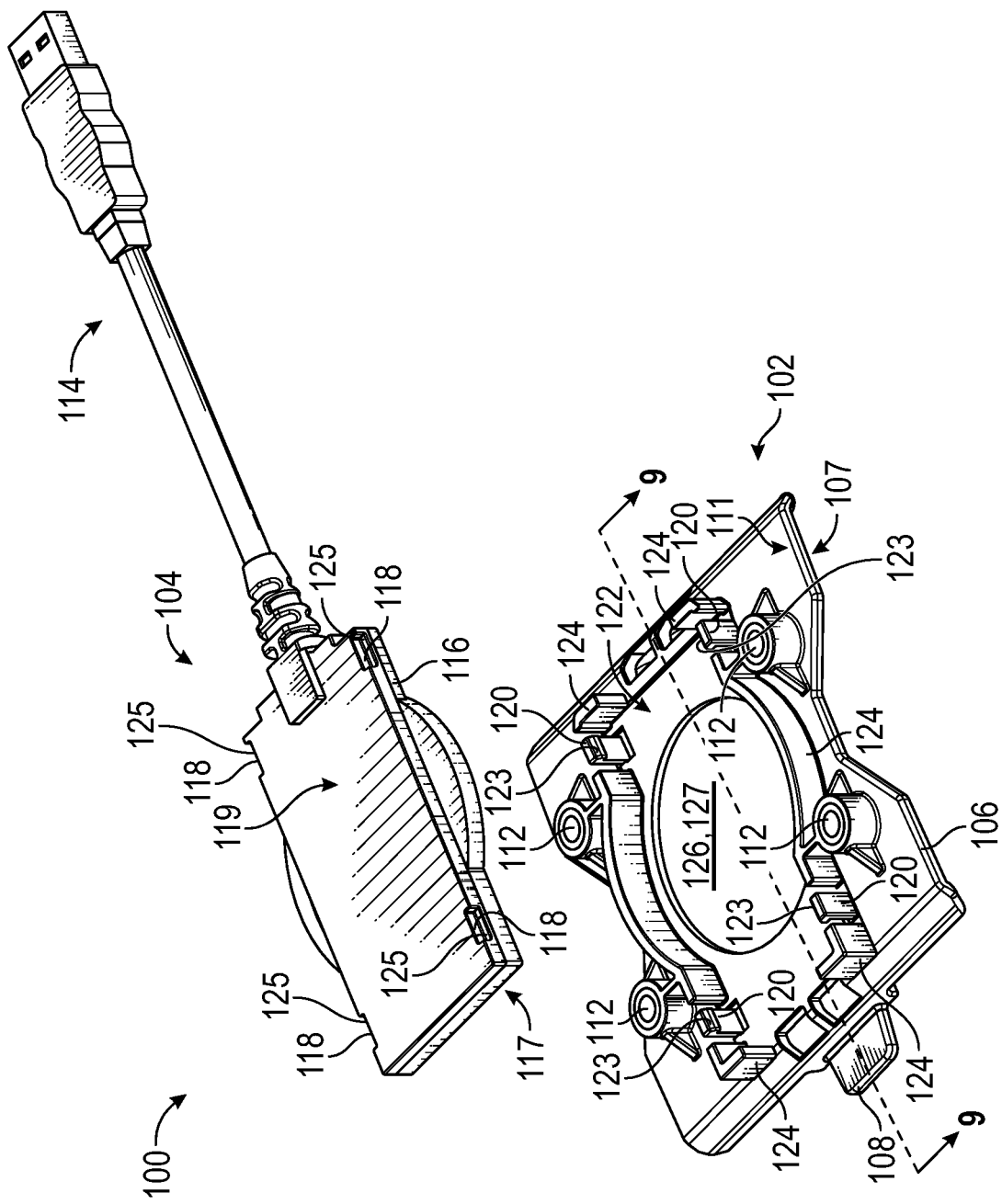
FIG. 8 is an exploded, rear perspective view of the charging system of FIG. 2, according to aspects of the present disclosure.

Referring to FIG. 8, the charging module 104 is removably coupled with the charging mount 102. In some embodiments, the charging mount 102 includes a module receiver 122 configured to receive the charging module 104. In some embodiments, the module casing 116 of the charging module 104 defines a front side 117 which is sized and shaped, when the charging module 104 is received within the module receiver 122, is positioned directly adjacent to the charging mount 102. In some embodiments, the module casing 116 defines a rear side 119 which is formed opposite the front side 117. The charging mount 102 may include extending walls 124 which extend outwardly from the rear surface 111 of the mount body 106. When the charging module 104 is received within the module receiver 122, the walls 124 surround at least a portion of the charging module 104 to limit the movement of the charging module 104.

The charging mount 102 may also include one or more mount couplers 120 having a respective tang 123 formed at the free end thereof which is sized and shaped to correspond with module couplers 118 that define recesses 125 configured to receive and engage a respective tang 123 to couple the charging module 104 with the charging mount 102. In some embodiments, the module couplers 118 may be positioned along the rear side 119 of the module casing 116. In one aspect, the charging mount 102 and the charging module 104 may be removably coupled. When installing the charging module 104, the tang 123 of each mount coupler 120 may initially deflect when abutting the module casing 116 and then engage a respective recess 125 for establishing a snap fit connection between the charging module 102 and the charging unit 104. Other suitable methods for coupling the charging mount 102 with the charging module 104 may be utilized as desired, such as a threaded engagement or a hook and fastener engagement.

Referring to FIGS. 8-11, the module receiver 122 includes a coil receiver 126. The coil 130, when the charging module 104 is installed within the module receiver 126, is positioned within the coil receiver 126. In some embodiments, the shape of the coil receiver 126 may correspond to the shape of the portion of the charging module 104 which contains the coil 130. In some embodiments, the charging module 104 may not include a separate portion or shape for the coil 130, and the coil receiver 126 and the module receiver 122 may be the same feature.

Figure 9:
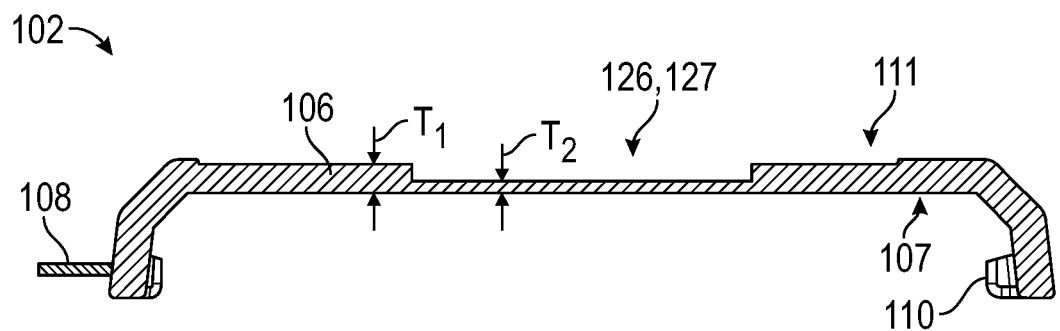
FIG. 9 is a cross-sectional side view of the charging mount taken along line 9-9 of FIG. 8, according to aspects of the present disclosure.

Referring to FIG. 9, in some embodiments the coil receiver 126 can define a recess 127. The mount body 106 defines a thickness T1 which is greater than a thickness T2 of the mount body 106 which corresponds with the coil receiver 126. As further shown in FIG. 9, the recess 127 is defined as the mount body 106 and defines a thickness T2 which is greater than zero. When the thickness T2 is zero, the coil receiver 126 defines an aperture 227, as shown in FIG. 10.

Figure 11:
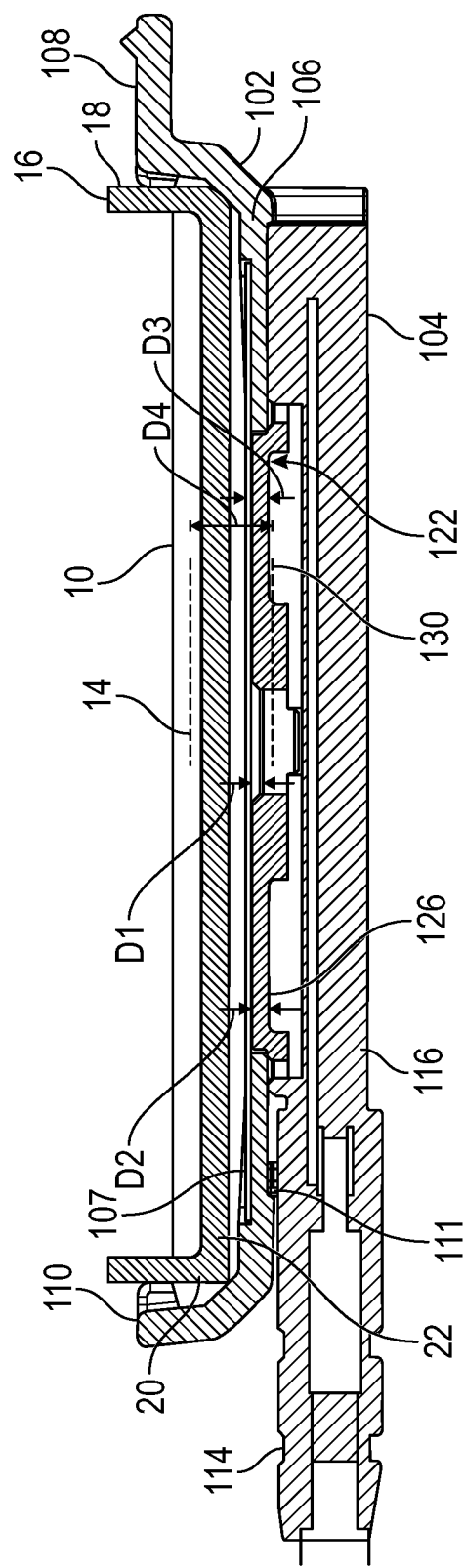
FIG. 11 is a cross-sectional side view of the charging system taken along line 11-11 of FIG. 2, according to aspects of the present disclosure.

As shown in FIG. 11, the coil receiver 126 extends toward the front surface 107 of the charging mount 102 so that a distance D1 defined between the front surface 107 of the charging mount 102 and the coil receiver 126 is less than a distance D2 defined between the front surface 107 of the charging mount 102 and the rear surface 111 of the charging mount 102. As such, when the coil 130 is positioned in the coil receiver 126, a distance D3 defined between coil 130 and the front surface 107 of the charging mount 102 and subsequently a distance D4 defined between the coil 130 and the device coil 14, are minimized to allow for improved interaction between the coil 130 and the device coil 14 during a wireless charging operation. In some embodiments, the distance D4 defined between the coil 130 and the device coil 14 to allow for greater operative interaction between the coil 130 and the device coil 14 may be equal to or less than about 6 mm. In some embodiments, a thickness of at least a portion of the front side 117 of the module casing 104 may be reduced in relation to the rear side 119 of the module casing 104 to further minimize the distance D4 between the coil 130 and the device coil 14.

Figure 12:
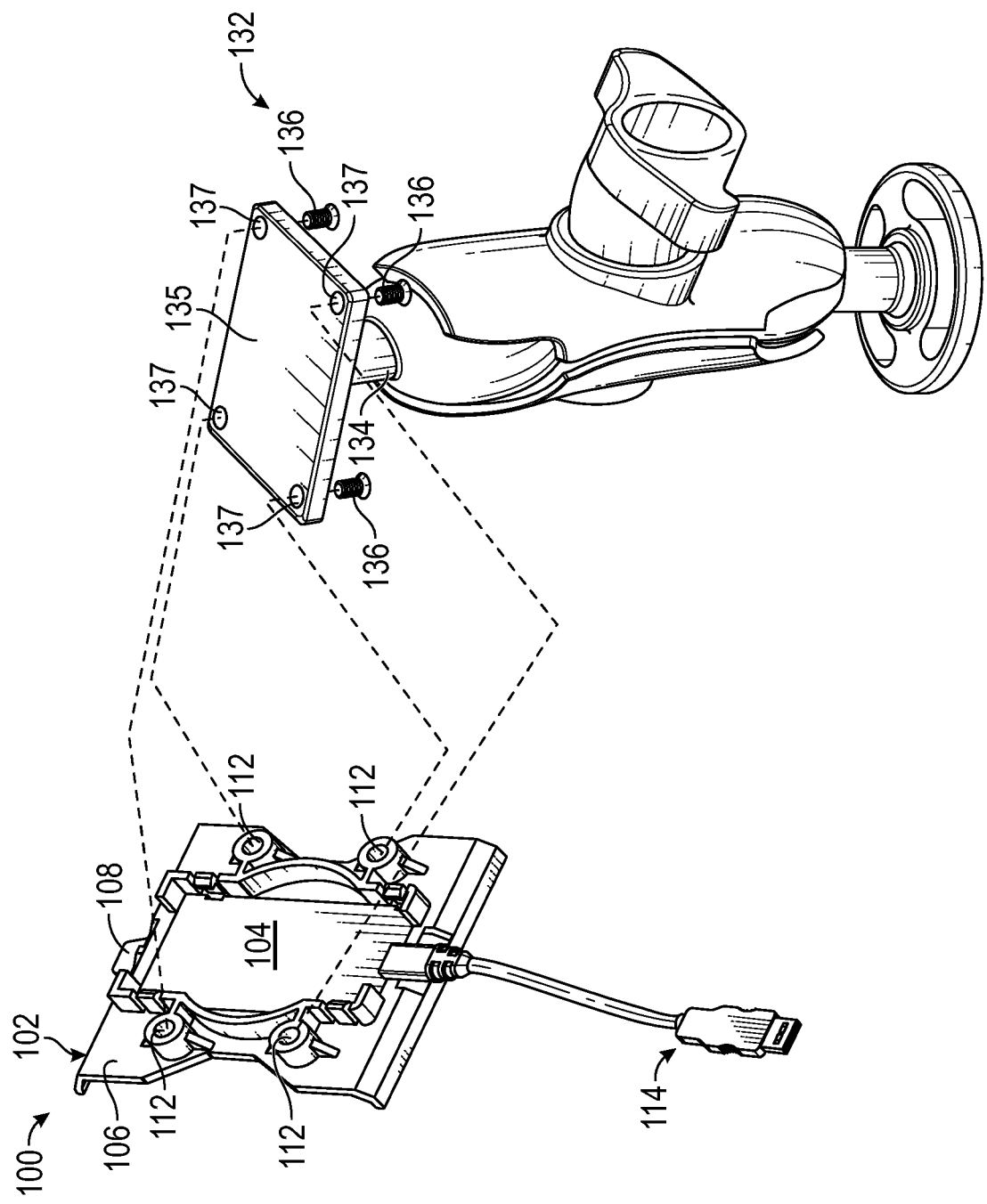
FIG. 12 is a perspective, exploded view of the charging system coupled with an external mount, according to aspects of the present disclosure.

Referring to FIG. 12, in one aspect the charging system 100 may be coupled with an external mount 132 to mount the charging system 100 and the portable device 10 (such as the portable device 10 illustrated in FIG. 1), for example on a vehicle. As such, the portable device 10 may be used in a hands-free mode. In some embodiments, the external mount 132 may have one or more arms 134. The arm, as illustrated in FIG. 12, includes a plate 135. The plate 135, as illustrated, is substantially rectangular, but in other embodiments can be any other suitable shape such as circular, triangular, or ovoid. The plate 135 includes one or more holes 137. The holes 137 are aligned with the external fasteners 112 positioned on the rear surface 111 of the mount body 106. The external mount 132, as illustrated in FIG. 12, includes fasteners 136 which are configured to correspond with the external fasteners 112 of the mount body 106. The fasteners 136 are inserted into and extend through the holes 137 to engage with the external fasteners 112. The fasteners 136 can be removed from the external mount 132. In some embodiments, the external mount 132 can include a plurality of arms 134, and each arm 134 includes one or more holes 137 and/or fasteners 136. In some embodiments, the external mount 132 may not include a plate 135. In some embodiments, the external mount 132 may have not have holes 137, and the fasteners 136 may be non-removable portions of the external mount 132.

As illustrated in FIG. 12, the external mount 132 includes 4 holes 137 formed on the plate 135 and 4 corresponding fasteners 136. In some embodiments, the fasteners 136 and external fasteners 112 may have threaded engagements. In other embodiments, the fasteners 136 and external fasteners 112 may have snap fit connections. The fasteners 136 and external fasteners 112 may also be magnetic. Other suitable methods to couple the charging mount 102 with the external mount 132 may be utilized as desired, such as a hook and fastener engagement or an adhesive connection.

Figure 13:
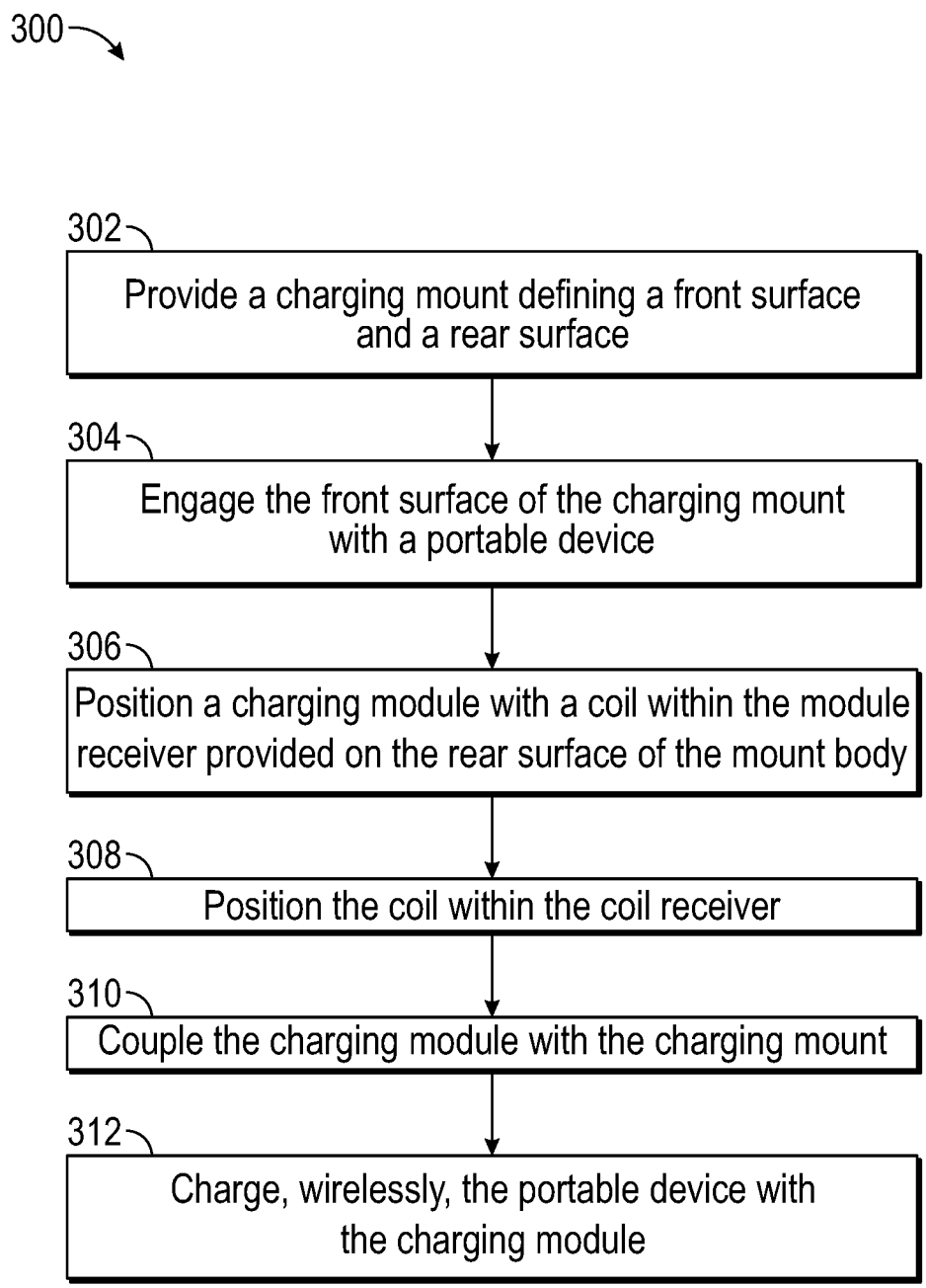
FIG. 13 is a flow diagram illustrating a method of wireless charging of a portable device, according to aspects of the present disclosure.

Referring to FIG. 13, a flowchart is presented in accordance with an example embodiment. The method 300 is provided by way of example, as there are a variety of ways to carry out the method. The method 300 described below can be carried out using the configurations illustrated in FIGS. 1-12, for example, and various elements of these figures are referenced in explaining example method 300. Each step shown in FIG. 13 represents one or more processes, methods or subroutines, carried out in the example method 300. Furthermore, the illustrated order of blocks is illustrative only and the order of the blocks can change according to the present disclosure. Additional steps may be added or fewer blocks may be utilized, without departing from this disclosure. The example method 300 can begin at step 302.

At step 302, a charging mount 102 is provided. The charging mount 102 may include a mount body 106 which defines a rear surface 111 and a front surface 107 defined in opposite relation to the rear surface 111. The rear surface 111 and the front surface 107 of the mount body 106 define a first thickness T1. The rear surface 111 of the mount body 106 includes a module receiver 122 with a coil receiver 126. The mount body 106 corresponds with the coil receiver 126 and defines a second thickness T2 which is less than the first thickness T1. In some embodiments, as illustrated in FIG. 9, the second thickness T2 may be greater than zero, and the coil receiver 126 may define a recess 127. In other embodiments, as illustrated in FIG. 10, the second thickness T2 may be zero, and the coil receiver 126 may define an aperture 227.

At step 304, the charging mount 102 is engaged with a portable device 10. In some embodiments, portable device 10 may be encased in a protective case 16, and the charging mount 102 may be engaged with the protective case 16. The portable device 10 includes a device coil 14. When engaged, the front surface 107 of the mount body 106 is engaged with the portable device 10 such that the front surface 107 of the mount body 106 is positioned adjacent to the portable device 10.

At step 306, a charging module 104 is positioned within the module receiver 122 provided on the rear surface 111 of the mount body 106. The charging module 104 includes a coil 130 which is configured to interact with the device coil 14 to wireless charge the portable device 10.

To minimize the distance D4 between the coil 130 and the device coil 14, at step 308, the coil 130 is positioned within the coil receiver 126.

At step 310, the charging module 104 is coupled with the charging mount 102. In some embodiments, the charging module 104 may be coupled with the charging mount 102 by a snap fit connection or other suitable methods as discussed above.

At step 312, the portable device 10 is wirelessly charged with the charging module 104 by the interaction of the coil 130 and the device coil 14. The smaller the distance D4 between the coil 130 and the device coil 14, the more efficiently and/or effectively the portable device 10 is charged.

In some embodiments, the charging mount 102 can also be coupled with an external mount 132 by one or more external fasteners 112 positioned on the rear surface 111 of the mount body 106 as discussed above.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system comprising:
a portable device having a device coil;
a charging mount with a mount body defining a rear surface and a front surface defined in opposite relation to the rear surface, the rear surface and the front surface of the mount body defining a first thickness, the front surface of the mount body configured to be engaged with the portable device such that the front surface of the mount body is positioned adjacent to the portable device, the rear surface of the mount body including a module receiver with a coil receiver, the mount body corresponding with the coil receiver defining a second thickness which is less than the first thickness; and
a charging module removably coupled with the charging mount and positioned within the module receiver, the charging module including a coil operable to interact with the device coil of the portable device to wirelessly charge the portable device, the coil being positioned within the coil receiver.

2. The system of claim 1, wherein the coil receiver defines a recess.

3. The system of claim 1, wherein the coil receiver defines an aperture.

4. The system of claim 1, wherein the distance between the coil and the device coil is equal to or less than about 6 mm.

5. The system of claim 1, wherein the charging module comprises a module casing, the module casing defining a front side and a rear side, wherein the front side of the module casing, when the charging module is coupled with the charging mount, is adjacent to the rear surface of the charging mount.

6. The system of claim 5, wherein the module casing includes an overmolded polymer surrounding the coil.

7. The system of claim 5, wherein the module casing is waterproof such that fluid communication with the coil is prevented.

8. The system of claim 1, wherein the charging mount includes one or more external fasteners positioned on the rear surface of the charging mount, the one or more external fasteners configured to couple the charging mount with an external mount.

9. The system of claim 1, wherein the charging module removably couples with the charging mount by snap fit connection.

10. A charging system configured to couple to and wireless charge a portable device having a device coil, the charging system comprising:
a charging mount with a mount body defining a rear surface and a front surface defined in opposite relation to the rear surface, the rear surface and the front surface of the mount body defining a first thickness, the front surface of the mount body configured to be engaged with the portable device such that the front surface of the mount body is positioned adjacent to the portable device, the rear surface of the mount body including a module receiver with a coil receiver, the mount body corresponding with the coil receiver defining a second thickness which is less than the first thickness; and
a charging module removably coupled with the charging mount and positioned within the module receiver, the charging module including a coil operable to interact with the device coil of the portable device to wirelessly charge the portable device, the coil being positioned within the coil receiver.

11. The charging system of claim 10, wherein the coil receiver defines a recess.

12. The charging system of claim 10, wherein the coil receiver defines an aperture.

13. The charging system of claim 10, wherein the distance between the coil and the device coil is equal to or less than about 6 mm.

14. The charging system of claim 10, wherein the charging module comprises a module casing, the module casing defining a front side and a rear side, wherein the front side of the module casing, when the charging module is coupled with the charging mount, is adjacent to the rear surface of the charging mount.

15. The charging system of claim 14, wherein the module casing includes an overmolded polymer surrounding the coil.

16. The charging system of claim 14, wherein the module casing is waterproof such that fluid communication with the coil is prevented.

17. The charging system of claim 10, wherein the charging mount includes one or more external fasteners positioned on the rear surface of the charging mount, the one or more external fasteners configured to couple the charging mount with an external mount.

18. The charging system of claim 10, wherein the charging module removably couples with the charging mount by snap fit connection.

19. A method of wireless charging a portable device with a device coil, the method comprising:
providing a charging mount with a mount body defining a rear surface and a front surface defined in opposite relation to the rear surface, the rear surface and the front surface of the mount body defining a first thickness, the rear surface of the mount body including a module receiver with a coil receiver, the mount body corresponding with the coil receiver defining a second thickness which is less than the first thickness;
engaging the charging mount with the portable device, the front surface of the mount body engaged with the portable device such that the front surface of the mount body is positioned adjacent to the portable device;
positioning a charging module within the module receiver provided on the rear surface of the mount body, the charging module including a coil;
positioning the coil within the coil receiver;
coupling the charging module with the charging mount; and
charging, wirelessly, the portable device with the charging module by the interaction of the coil and the device coil.

20. The method of claim 19, wherein the charging mount includes one or more external fasteners positioned on the rear surface of the mount body, the method further comprising:
coupling the charging mount with an external mount by the one or more external fasteners.

* * * * *